United States Patent [19]

Wagner

[11] Patent Number: 4,597,134
[45] Date of Patent: Jul. 1, 1986

[54] FEED MECHANISM FOR A PATTY MAKING MACHINE

[76] Inventor: Richard C. Wagner, c/o Hollymatic Corporation, 600 E. Plainfield Rd., Countryside, Ill. 60525

[21] Appl. No.: 657,254

[22] Filed: Oct. 3, 1984

[51] Int. Cl.$^4$ ............................................. A22C 7/00
[52] U.S. Cl. ........................................ 17/32; 17/40; 222/404
[58] Field of Search .................... 17/32, 40; 222/404

[56] References Cited

U.S. PATENT DOCUMENTS

| | | |
|---|---|---|
| 2,299,314 | 10/1942 | Elesh et al. |
| 2,889,574 | 6/1959 | Thielen et al. ............... 17/32 X |
| 3,312,997 | 4/1967 | Merrels . |
| 3,526,923 | 9/1970 | Barnes, Jr. . |
| 3,691,594 | 9/1972 | Klein ................................ 17/32 |
| 3,887,964 | 6/1975 | Richards ........................ 17/32 |
| 4,054,967 | 10/1977 | Sandberg et al. . |
| 4,106,160 | 8/1978 | Jentsch . |
| 4,146,145 | 3/1979 | Easton .......................... 222/404 |
| 4,217,996 | 8/1980 | Good ............................ 222/404 |
| 4,494,647 | 1/1985 | Davis ........................ 222/404 X |

FOREIGN PATENT DOCUMENTS 2062176  6/1972  Fed. Rep. of Germany ...... 222/404

Primary Examiner—John Sipos
Assistant Examiner—Steven P. Weihrouch
Attorney, Agent, or Firm—Wood, Dalton, Phillips, Mason & Rowe

[57] ABSTRACT

A patty making machine is provided having a feed mechanism using an auger which is reciprocally driven to push the product into the molding chamber, and is rotated during the retraction stroke to unscrew the auger back through the product. The auger is disposed along one side of a conical hopper and the hopper is rotated about its axis.

23 Claims, 6 Drawing Figures

FEED MECHANISM FOR A PATTY MAKING MACHINE

BACKGROUND OF THE INVENTION

1. Technical Field

This invention relates to patty making machines and more particularly to the feed mechanism for a patty making machine.

2. Background Art

Food patty molding machines using augers to feed the food product into the molding mechanism are known in the art. Two such machines are shown in U.S. Pat. Nos. 4,054,967 and 4,106,160, in which the augers rotate to drive the product into the molding mechanism. However, the twisting action of the auger causes the product to be undesirably overworked before it is molded into a patty. Further, these machines often encounter "bridging" wherein the product at the bottom of the hopper bridges over the auger without being caught by the auger for feeding into the molding mechanism. As a result, the product is not automatically used up by the feed mechanism and must be worked free by the operator.

Still another feed mechanism known in the prior art is disclosed in U.S. Pat. No. 2,299,314 which has a vertical auger in a rotating hopper. The twisting action of this mechanism overworks the product similar to the above-described machines, and the feed rate of this machine is somewhat difficult to control.

The present invention is directed toward overcoming one or more of the problems as set forth above.

SUMMARY OF THE INVENTION

In one aspect of the present invention, a patty making machine is provided having a feed mechanism using an auger which is disposed along one side of a conical hopper and moved to feed product into the molding chamber, where the hopper and auger are rotated one relative to the other about the hopper axis. In another aspect of the present invention, the auger is reciprocally driven so as to push the product into the molding chamber during the feed stroke, and is rotated during the retraction stroke to unscrew the auger back through the product.

It is an object of the present invention to provide a feed mechanism which prevents bridging of the product from occurring at the bottom of the hopper. Another object of the present invention is to ensure that the product is completely cleared out of the hopper by the feed mechanism, and that virtually all of the product is formed into patties and moved out of the machine at the end of a particular operation. Still another object of the present invention to provide a feed mechanism which does not overwork the product.

DESCRIPTION OF THE PREFERRED EMBODIMENT

Figure 1:
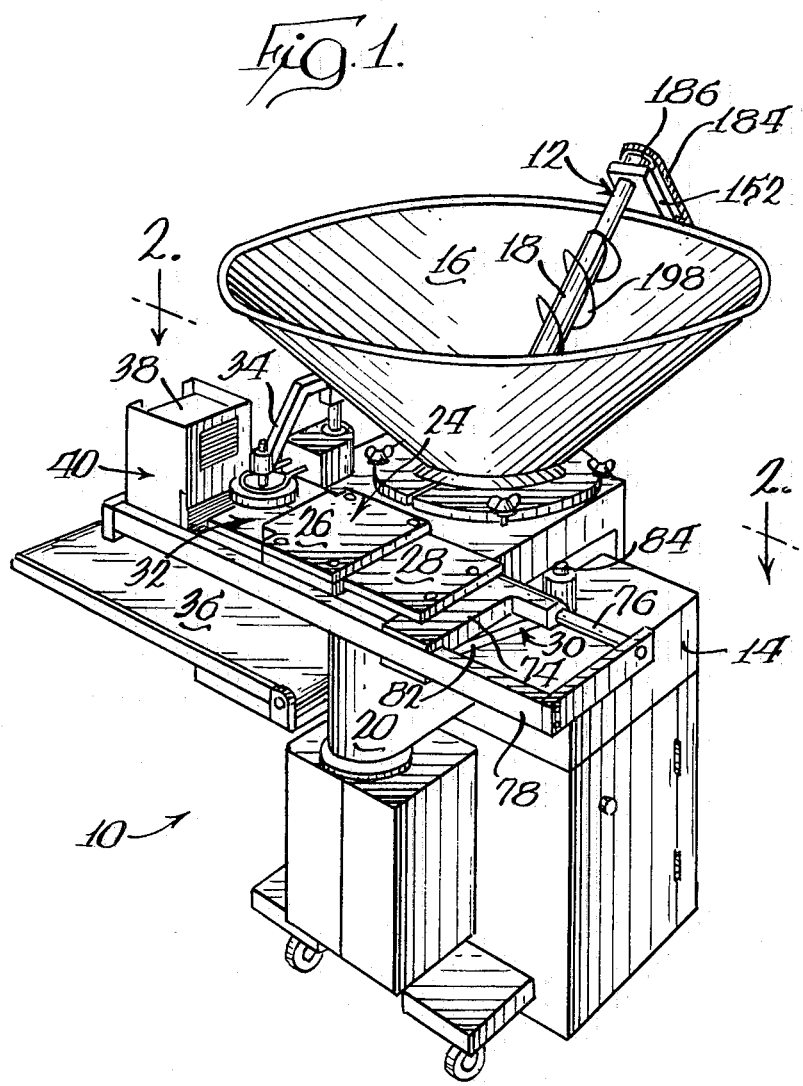
FIG. 1 is a perspective view of a patty molding machine embodying the present invention.

FIG. 1 is a perspective view of the patty making machine 10 having the feed mechanism 12 of the present invention. The machine 10 includes a base 14 supporting a hopper 16 thereon in which large quantities of the product to be formed into patties, such as ground meat, may be placed. The hopper 16 is preferably in the shape of an inverted cone and can be made of, for example, molded polypropylene. The auger 18 of the feed mechanism 12 is at the angle of the hopper sides so as to extend substantially along one side of the hopper 16. The feed mechanism 12 will be described in more detail hereafter.

A ram housing 20 defines a chamber 22 (see FIG. 3) into which the product (indicated by reference numeral 23) is fed in preparation for forming into patties. Located above the ram housing 20 is the molding station 24 including a rigidly mounted top plate 26 over a sliding mold plate 28. A mold plate drive 30 reciprocates the mold plate 28 between the molding station 24 and a knockout station 32 where a vertically reciprocating knockout 34 is disposed to knock the molded patties out of the mold plate 28 and onto a conveyor 36. Paper 38 is fed by a paper feed 40 in a suitable manner to ensure that patties do not become stuck together.

Figure 2:
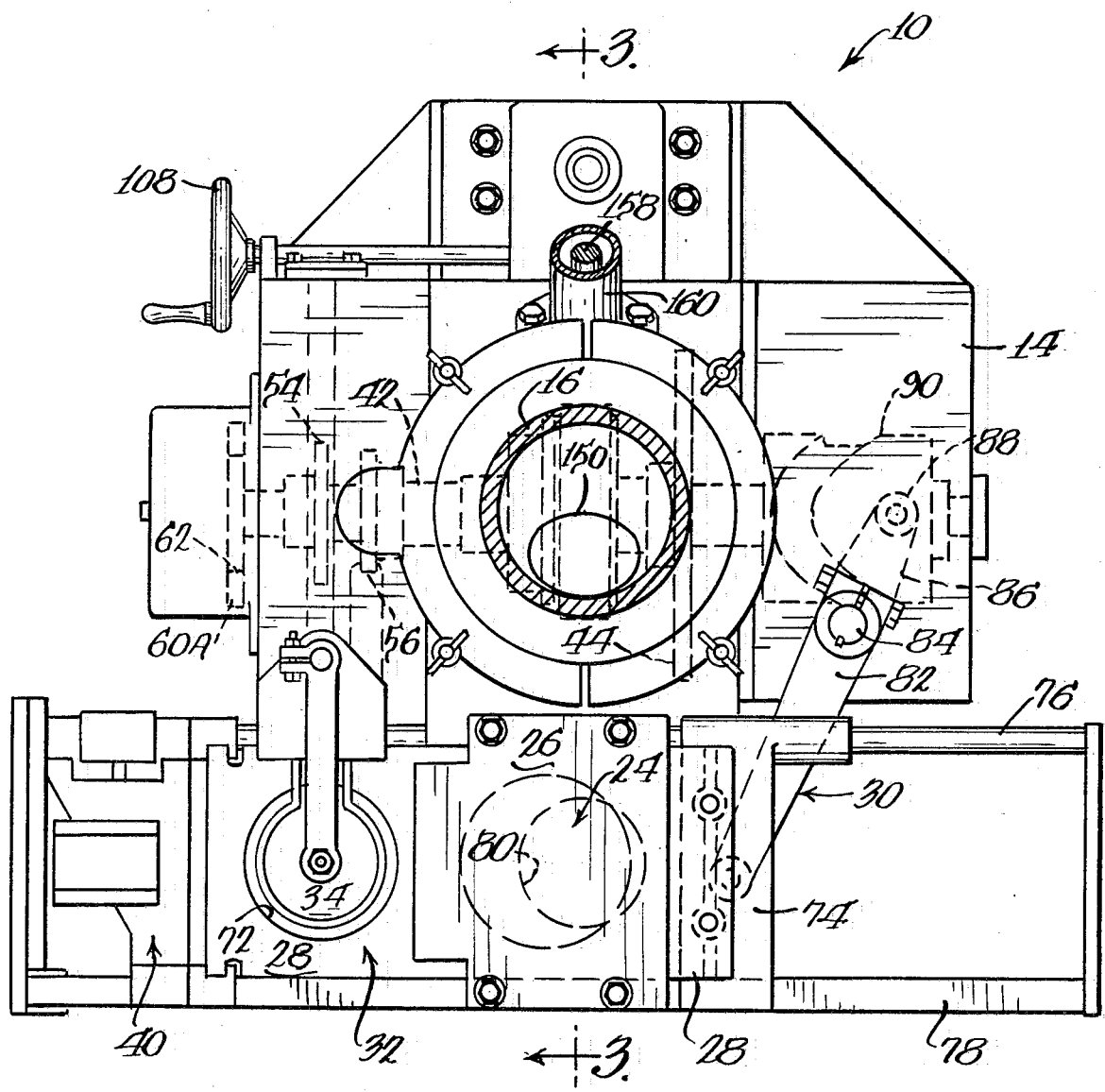
FIG. 2 is a cross-sectional view taken along line 2—2 of FIG. 1.
Figure 3:
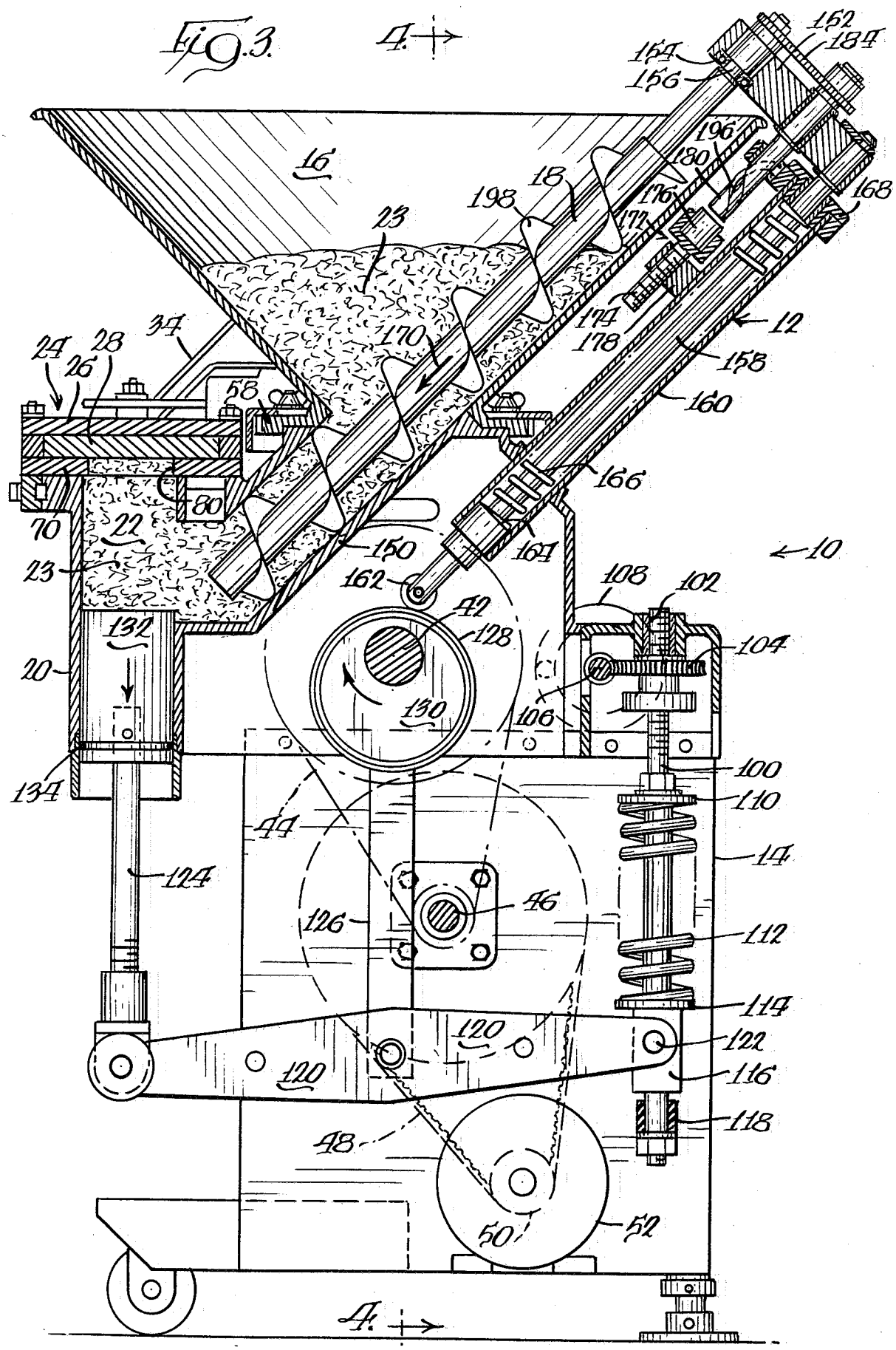
FIG. 3 is a cross-sectional view taken along line 3—3 of FIG. 2.
Figure 4:
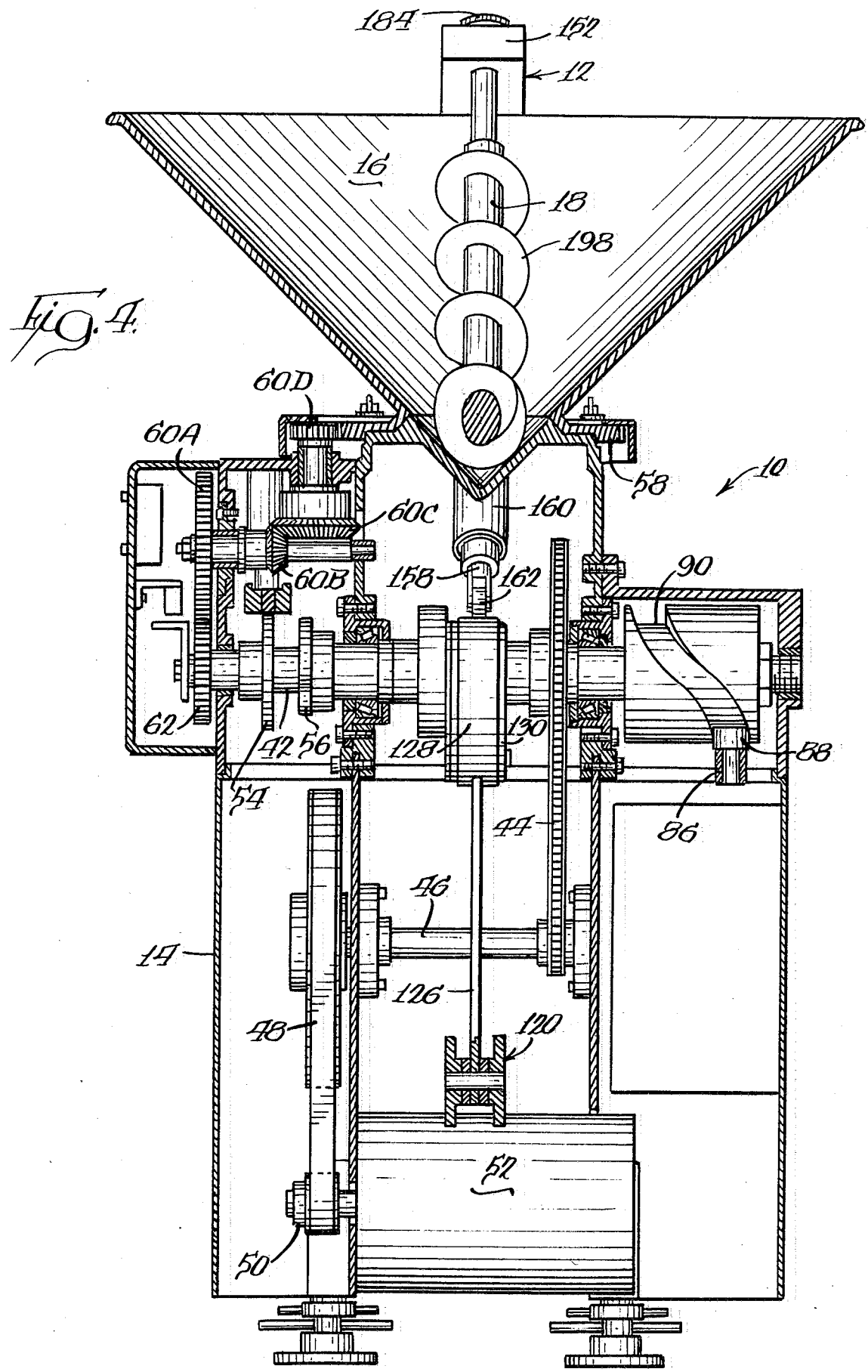
FIG. 4 is a cross-sectional view taken along line 4—4 of FIG. 3.

The above components are more fully illustrated in FIGS. 2-4.

Specifically, the machine 10 has a rotor drive shaft 42 (see FIG. 4) off of which the various mechanisms of the machine 10 are driven, thereby providing for synchronization of the various cooperating mechanisms. The rotor drive shaft 42 is itself driven by a roller chain 44 on an intermediate drive shaft 46 which is connected by a toothed belt 48 to the rotor 50 of a suitable drive motor 52.

The rotor drive shaft 42 has a knockout cam 54 and a paper feed cam 56 thereon to appropriately drive the knockout 34 and paper feed 40 in conjunction with the other machine operations. Any suitable driving connection to the knockout 34 and paper feed 40 can be used and, as these structures do not form a part of the present invention, the driving connections are not further illustrated.

The hopper 16 is rotatably mounted to the machine 10 so that the product 23 therein is mixed up and moved to the auger 18, thereby preventing "bridging" and ensuring a constant and complete feed of the product 23. The hopper 16 includes a gear flange 58 at its lower end which is driven in rotation by a set of cooperating gears 60A-D (see FIG. 4) driven by a hopper drive gear 62 on the rotor drive shaft 42.

The mold plate 28 is located between the top plate 26 and the fill plate 70 and has a mold opening 72 within which the patties are molded. In FIG. 3, the mold opening 72 is located at the knockout station 32 beneath the knockout 34.

The mold plate 28 is secured to a drive shuttle 74 which reciprocates it between the molding station 24 and the knockout station 32. The drive shuttle 74 follows a guide rod 76 and a guide rail 78.

The mold plate 28 when reciprocated to the right in FIG. 2 is located so that its mold opening 72 is at the molding station 24 (see FIG. 5) and located over the opening 80 in the fill plate 70 and thus in communication with the chamber 22.

The mold plate drive 30 includes a mold plate drive arm 82 having one end slidably secured on the drive shuttle 74 and the other end fixed for rotation with a vertical shaft 84. A lever arm 86 is fixed for rotation on the bottom of the vertical shaft 84 and has a roller 88 on its outer end (see FIG. 4). The roller 88 is received in a barrel cam 90 which is fixed to the rotor drive shaft 42 for rotation therewith.

It is apparent from the figures that as the barrel cam 90 rotates, the roller 88 will be moved along the barrel cam 90 to the pivot the lever arm 86 and drive arm 82 about the axis of the vertical shaft 84. Accordingly, rotation of the barrel cam 90 180° from the position shown in FIGS. 2 and 4 will cause the lever arm 86 and drive arm 82 to rotate counterclockwise together, thereby moving the drive shuttle 74 secured on the one drive arm end all the way to the right in FIG. 2 with the mold opening 72 at the molding station 24.

The ram structure of the patty making machine 10 is best illustrated in FIG. 3. A ram stroke adjusting rod 100 is supported on the base 14 by a threaded connection 102. The adjusting rod 100 has a gear 104 secured thereto which engages a worm 106 on a hand wheel 108 (see FIG. 2). The hand wheel 108 can accordingly be used to turn the adjusting rod 100 and therefore move it up and down for a purpose which will be described hereafter.

The adjusting rod 100 has an upper shoulder 110 suitably secured thereto against which one end of a compression spring 112 abuts. The other end of the compression spring 112 abuts on a lower shoulder 114 which is secured to a sleeve 116 slidably mounted on the adjusting rod 100. The compression spring 112 therefore biases the sleeve 116 against the bumper 118 secured to the bottom of the adjusting rod 100.

A ram drive arm 120 is pivotably mounted about a sleeve pin 122 on one end and is pivotably secured to a ram rod 124 on the other. An eccentric arm 126 is pivotably secured to the ram drive arm 120 intermediate the two ends of the ram drive arm 120. The eccentric arm 126 is on its upper end secured to an eccentric sleeve 128 located around a drive eccentric 130 on the rotor drive shaft 42. The eccentric arm 126 therefore is driven up and down by rotation of the eccentric 130 and, since the compression spring 112 essentially holds the one end of the ram drive arm 120 stationary, the arm 120 pivots about the sleeve pin 122 to reciprocate the ram rod 124 up and down. Accordingly, the ram 132 on the ram rod 124 is reciprocated in the chamber 22, forcing product 23 into the mold opening 72 on its up stroke (see FIG. 5) and clearing the chamber 22 so that product 23 can be fed therein on its down stroke (see FIG. 3). The timing of the eccentric 130 is such that the ram 132 is generally at the bottom of the down stroke when the auger 18 is feeding product into chamber 22.

A seal 134 is provided around the ram 132 to prevent liquids such as meat juices from leaking from the chamber 22 into the interior of the machine 10.

It can thus be seen that the hand wheel 108 can be used to raise or lower the sleeve pin 122 about which the ram drive arm 120 pivots in order to lower or raise the limit of the ram stroke. It can further be seen that the pressure of the ram up stroke has an upper limit and, if that pressure is exceeded, the ram 132 will not continue to move up but rather the pivot at the sleeve pin 122 will move up against the bias of the compression spring 112.

Figure 5:
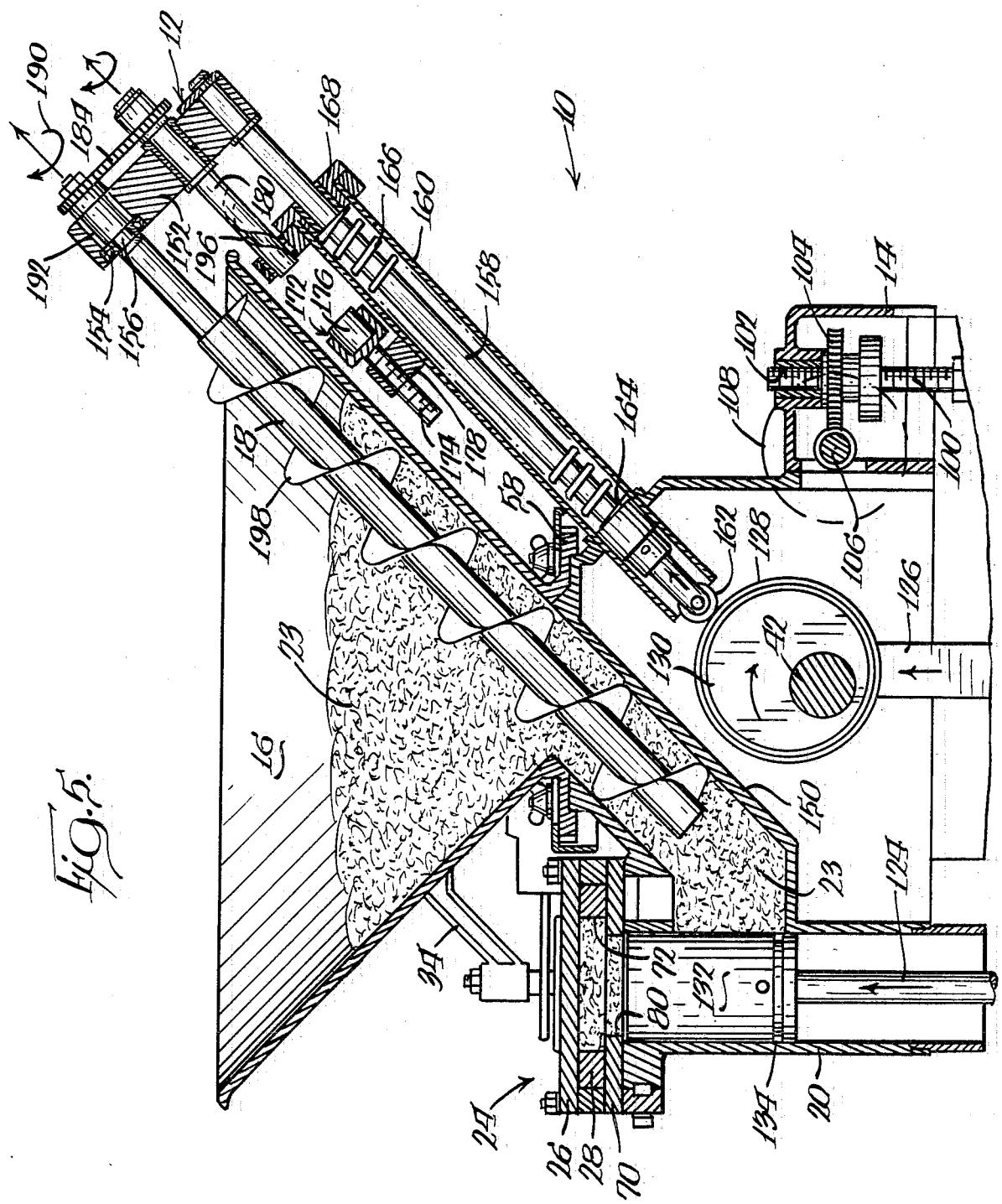
FIG. 5 is a view similar to FIG. 3 but showing the machine in a different operational configuration.
Figure 6:
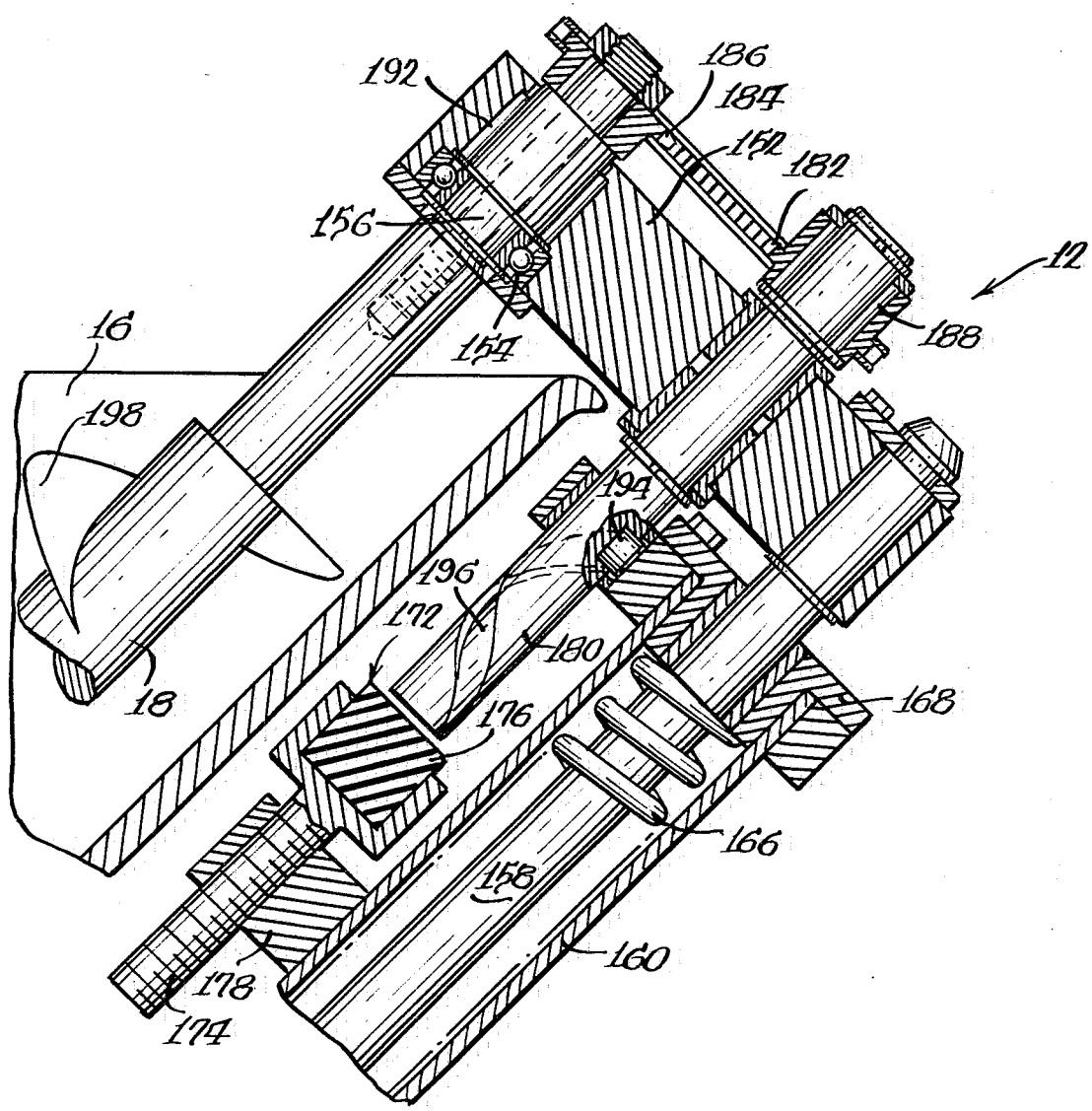
FIG. 6 is an enlarged cross-sectional view of a portion of the feed mechanism of the present invention.

The product feed mechanism 12 of the present invention is best illustrated in FIGS. 3 and 5-6. The auger 18 extends along one side of the hopper 16 through a tubular connection 150 between the chamber 22 and the bottom of the hopper 16. The upper end of the auger 18 is suitably mounted to an end plate 152 for axial movement with and rotation with respect to the end plate 152. As shown in FIG. 6, one such suitable mounting consists of roller bearings 154 fixed to the end plate 152 and received within a groove 156 in the end of the auger 18.

A reciprocable drive rod 158 is rigidly secured to the end plate 152 by suitable means and is received within a tubular housing 160 secured to the base 14. At the lower end of the drive rod 158 is a roller 162 positioned to ride on the eccentric sleeve 128. The lower end of the drive rod 158 also has a defined shoulder 164 against which a compression spring 166 abuts. The upper end of the compression spring 166 abuts the end sleeve 168 of the housing 160 within which the drive rod 158 is axially reciprocable so that the spring 166 biases the rod 158 and the attached end plate 152 and auger 18 down in the direction of the arrow 170 in FIG. 3 (in the direction of the feed stroke).

Axial reciprocation of the auger 18 is thus controlled by the rotation of the eccentric 130. As shown in FIG. 3, as the eccentric 130 turn toward where its point of minimum radius is engaged (through the eccentric sleeve 128) by the roller 162, the compression spring 166 moves the drive rod 158 and attached auger 18 down in the feed stroke, the auger 18 thereby pushing product 23 down through the tubular connection 150 and into the chamber 22 where it may thereafter be molded into a patty.

Since the feed mechanism 12 and ram 132 are controlled by opposite sides of the eccentric 130, as the auger 18 moves toward the chamber 22 in its feed stroke, the ram 132 is moved down out of the chamber 22 so that the product 23 can be fed into it. Similarly, when the ram 132 is moved up to mold a patty as shown in FIG. 5, the auger 18 is retracted up out of the way and in position for another feed stroke when the ram 132 is thereafter retracted.

An adjustable stroke stop 172 is also provided so that the movement of the auger 18 toward the chamber 22 may be limited if desired. The stop 172 consists of an adjusting screw 174 supporting a rubber bumper 176 on one end and extending through an ear 178 on the housing 160. The adjusting screw 174 may thus be turned in the ear 178 to position its bumper 176 as desired.

The bumper 176 abuts a cam member 180 suitably mounted to the end plate 152 for axial motion therewith. Thus, if the eccentric 130 would allow the auger 18 to be moved down further than desired during the feed stroke, the bumper 176 may be positioned so as to abut the cam member 180 to prevent that motion. As a result, during that portion of the rotation of the eccentric 130 where the auger 18 would otherwise move beyond the desired limit, the entire feed mechanism 12 will be supported by the stroke stop 172 so that the roller 162 will be spaced from the eccentric 130.

The cam member 180 is also mounted for rotation with respect to the end plate 152 and has a sprocket 182 driving a chain 184 connected to an auger sprocket 186 to rotate the cam member 180 and auger 18 together. A suitable one-way clutch, such as shown at reference numeral 188, is provided in this chain and sprocket connection so that the auger 18 will be rotated in the direction of the arrow 190 (see FIG. 5) only as it is retracted away from the chamber 22. During the feed stroke, the cam member 180 will rotate, but the auger 18 will not rotate with it. A second one-way clutch 192 is provided to prevent the auger 18 from rotating during the feed stroke as it pushes the product 23 into the chamber 22.

The cam member 180 itself is caused to rotate as follows. A fixed roller 194 is mounted to the tubular housing 160 and is received within a helical cam track 196 around the cam member 180. As a result, as the cam member reciprocates with the end plate 152, it moves past the fixed roller 194 such that the cam member 180 must rotate to maintain the roller 194 in the cam track 196.

Inasmuch as the rotation of the auger 18 is intended to cause it to screw back through the product 23 (in effect leaving the product 23 in place but behind a different auger flight 198), it is desirable to rotate the auger 18 at a rate of one revolution for every pitch of axial movement (the pitch being the distance between flights 198 of the auger 18). This may be accomplished by the structure illustrated in the figures where the cam track 196 and auger flights 198 have equal pitches and the sprockets 182, 186 are the same size. Other combinations could also be used so long as the ratio of pitch to associated sprocket diameter is equal for the auger 18 and cam member 180.

The feed mechanism 12 thus operates with a pushing action rather than the twisting action of conventional auger drives. As a result, undesirable overworking of the product 23 normally occurring from the twisting action of the auger is avoided. Further, the feed mechanism 12 in cooperation with the rotating hopper 16 prevents "bridging" over the auger 18 at the bottom of the hopper 16, and the product 23 is thus uniformly fed to the chamber 22.

Other aspects, objects and advantages of this invention can be obtained from a study of the drawings, the disclosure and the appended claims.

I claim:

1. In a patty making machine having a chamber into which the patty product is fed from a hopper for forming into a patty, a product feed mechanism comprising:
   an auger extending between the hopper and the chamber;
   means for axially reciprocating said auger toward and away from said chamber, movement toward said chamber feeding product into the chamber;
   means for rotating said auger during movement away from the chamber, said rotation being controlled to unscrew the auger back through the product; and
   means for securing said auger against rotation during movement toward the chamber.

2. The feed mechanism of claim 1, wherein the reciprocating means comprises:
   a machine drive having an eccentric rotatable therewith;
   a rod following said eccentric; and
   means connecting said auger and said rod for reciprocation together.

3. The feed mechanism of claim 2, wherein the rod has a spring biasing a rolling follower into engagement with the eccentric, said eccentric moving the rod against the bias of the spring to move the connected auger away from the chamber.

4. The feed mechanism of claim 2, wherein said rotating and securing means comprise:
   a rotatable member carried with said rod, said member having a helical cam track therein;
   a fixed follower received within said cam track to rotate said member as it reciprocates past said follower; and
   means for connecting the auger to rotate with the member only during movement away from the chamber.

5. The feed mechanism of claim 4, wherein said connecting means comprises a chain and sprocket connection with a one-way clutch.

6. The feed mechanism of claim 5, wherein the ratio of the cam track pitch to the associated sprocket diameter of the rotatable member is substantially equal to the ratio of the screw pitch to the associated sprocket diameter of the auger.

7. The feed mechanism of claim 1, wherein the hopper is conical with its inner wall at a slant about an axis intersected by the auger axis at the same slant, and further comprising means for rotating the hopper relative to the auger about the hopper axis.

8. In a patty making machine having a chamber into which the patty product is fed for forming into a patty, a product feed mechanism comprising:
   a hopper for the patty product;
   a tubuler connection between the bottom of the hopper and the chamber;
   an auger having flights with a pitch therebetween, said auger extending into said tubular connection and extending substantially along a side of the hopper;
   means for axially reciprocating the auger within the tubular connection, whereby movement toward the chamber feeds product into the chamber;
   means for rotating the auger during axial motion away from the chamber at a rate of one revolution for every unit of axial movement equal to one pitch; and
   means for securing the auger against rotation during axial motion toward the chamber.

9. The feed mechanism of claim 8, wherein said rotating and securing means comprise:
   a fixed follower received within a helical cam track; and
   means for connecting said auger to rotate with the cam track only during motion away from the chamber.

10. The feed mechanism of claim 9, wherein the connecting means comprises a chain and sprocket interconnection with a one-way clutch.

11. The feed mechanism of claim 10, wherein the reciprocating means comprises:
   a machine drive having an eccentric rotatable therewith;
   a rod following said eccentric; and
   means connecting said auger and said rod for reciprocation together.

12. The feed mechanism of claim 8, wherein the reciprocating means comprises:
   a machine drive having an eccentric rotatable therewith;
   a rod rollowing said eccentric; and
   means connecting said auger and said rod for reciprocation together.

13. The feed mechanism of claim 12, wherein the rod has a spring biasing a rolling follower into engagement with the eccentric, said eccentric moving the rod against the bias of the spring to move the connected auger away from the chamber.

14. The feed mechanism of claim 8, wherein the hopper is conical and further comprising means for rotating the hopper about its axis.

15. In a patty making machine having a drive and a chamber into which patty product is fed for forming into a patty, a product feed mechanism comprising:
a conical hopper for the patty product;
a tubular connection between the bottom of the hopper and the chamber;
an auger extending substantially along one side of the hopper and having one end extending into said tubular connection;
a rod secured to the other end of the auger for reciprocation together in the direction of the auger axis, said rod being reciprocally driven with the drive;
a rotatable member mounted for reciprocation with the auger and rod and having a cam track spirally wound therearound;
a fixed follower engaging said cam track to thereby rotate said member as it reciprocates past said follower; and
a chain and sprocket interconnection between the auger and the member, said interconnection including a clutch structure adapted to rotate the auger with the member during movement of the auger away from the chamber and to secure the auger against rotation during movement of the auger toward the chamber.

16. The feed mechanism of claim 15, further comprising means mounting the conical hopper for rotation about its axis, and means between the drive and the hopper for rotating the hopper.

17. The feed mechanism of claim 15, wherein the rod is reciprocally driven by:
an eccentric rotated by the drive;
a following roller on the rod; and
a spring biasing the rod roller toward the eccentric.

18. The feed mechanism of claim 17, further comprising an adjustable stop adapted to limit the movement of the auger toward the chamber.

19. The feed mechanism of claim 15, wherein the auger is rotated at a rate which unscrews the auger back through the product as the auger is axially moved away from the chamber.

20. The feed mechanism of claim 19, wherein the auger has flights with a pitch therebetween, and the auger is rotated at a rate of one revolution for every unit of axial movement equal to one pitch away from the chamber.

21. In a patty making machine having a chamber into which the patty product is fed for forming into a patty, a product feed mechanism comprising:
a hopper adapted to receive a quantity of product, said hopper being conical with its inner wall at a slant about an axis;
an auger extending between the hopper and the chamber, said auger extending along said hopper wall and having its axis intersecting the hopper axis;
means for advancing the auger along its axis toward the chamber to feed product thereto; and
drive means for rotating the hopper and auger one relative to the other about the hopper axis.

22. The feed mechanism of claim 21, further comprising means for rotating the auger about its axis during motion away from the chamber, said rotation being controlled to unscrew the auger back through the product.

23. In a patty making machine having a chamber into which the patty product is fed for forming into a patty, a product feed mechanism comprising:
a hopper adapted to receive a quantity of product, said hopper being conical with its inner walls at a slant about an axis;
a feed connection between the hopper and the chamber;
an auger extending along a side of the hopper and into the feed connection, said auger extending along said hopper wall and having its axis intersecting the hopper axis;
drive means for rotating the hoppr and auger one relative to the other about the hopper axis; and
means for moving the auger along its axis to feed product from the hopper into the feed connection and chamber.

* * * * *